United States Patent [19]

Schumm, Jr.

[11] Patent Number: 5,026,616
[45] Date of Patent: Jun. 25, 1991

[54] ELECTROLESS PLATED PLASTIC COVERS FOR GALVANIC CELLS

[75] Inventor: Brooke Schumm, Jr., Bay Village, Ohio

[73] Assignee: Eveready Battery Company, Inc., St. Louis, Mo.

[21] Appl. No.: 436,607

[22] Filed: Nov. 15, 1989

[51] Int. Cl.$^5$ .............................................. H01M 2/02
[52] U.S. Cl. .................................... 429/168; 429/170; 429/177
[58] Field of Search ....................... 429/168, 170, 177; 428/461, 462

[56] References Cited

U.S. PATENT DOCUMENTS

| 2,532,283 | 12/1950 | Brenner et al. | 204/48 |
| 3,591,352 | 7/1971 | Kennedy et al. | 428/462 X |
| 3,795,545 | 3/1974 | Kamai | 429/168 X |
| 3,849,172 | 11/1974 | Chin et al. | 428/462 |
| 4,732,807 | 3/1988 | Maeda et al. | 428/462 X |

Primary Examiner—Stephen J. Kalafut
Attorney, Agent, or Firm—Robert W. Welsh

[57] ABSTRACT

A plastic leak resistant and corrosion resistant end cover and contact for a battery having an electroless plated layer of nickel, tin or an alloy of nickel and tin on the surfaces thereof so that when in place in a battery it forms a conductive path for carrying current from inside the battery to the outside. A battery employing at least one of the afore described end cover.

11 Claims, 1 Drawing Sheet

ELECTROLESS PLATED PLASTIC COVERS FOR GALVANIC CELLS

BACKGROUND OF THE INVENTION

The batteries used in conventional home appliances or flashlights usually have plated metal end covers which form the positive and negative contact for the battery. The battery industry has used all-metallic covers on galvanic cells for many years. These covers perform three functions. First, the cover normally provides an electrical contact point for the cell. Second, the internal battery components are protected from external hazards. And third, exudate from the cell is contained within the battery. The covers are usually made of steel which has been plated with a metal such as nickel or tin. Although these covers have been used successfully in commercial products, there has always been a problem with corrosion of the covers' base steel. This type of problem is particularly noticeable when batteries have been completely discharged and then stored for an extended period of time. This situation can occur when a flashlight's batteries have been run down through continuous operation and then left in the flashlight for several months.

Conventional covers for carbon-zinc batteries have traditionally had a problem with corrosion whenever the cell's exudate was able to contact the cover or when the cell was exposed to humid conditions for a long period of time. Corrosion due to leakage is particularly noticeable after the cell has been on a long continuous discharge. The covers are usually produced by forming and punching the part from preplated steel strips. This material has micropores in the protective plate and develops stress cracks in the punching operation. When the cell's acidic electrolyte penetrates these micropores and stress cracks, corrosion of the base metal can occur. This problem detracts from the appearance of the battery and can proceed to the point that the battery will not function.

SUMMARY OF THE INVENTION

In accordance with the present invention, improved covers are provided for a conventional battery through the use of electroless plated plastic material. Electroless plating techniques are used to apply a thin layer of metal, such as nickel or tin, to the plastic top and bottom covers of a dry cell battery. Using plastic instead of steel as the base material for the cover eliminates the possibility of cover perforation and the rust color that is caused by the corrosion of the iron in the base steel. Even if the relatively noble metal is too thin to prevent some electrolyte contact with the base part, the plastic cannot corrode. Scratches or pinholes through the protective metal layer may be visually distracting, but they will not lead to corrosion, perforation, and failure of the cover. Electroless plating techniques are employed to produce a thin coating of nickel or tin on both sides of the cover and on the circular edge of the cover to provide a continuous electrically conductive path from the interior of the dry cell battery to the external contact surface.

An improved corrosion resistant electric battery is also provided having a shell with first and second open ends for containing the several components making up a galvanic cell. For example, an anode, cathode and electrolyte material are contained within the shell. A first plastic end cover having an electrolessly plated metallic coating thereon is provided for closing one end of the shell and for forming a first electrical contact for the battery. A second plastic end cover having an electrolessly plated metal coating thereon is used to close a second opening in the shell and for providing a second contact for the battery. Through the use of the electrolessly plated plastic covers a substantially improved corrosion resistant battery is provided.

DETAILED DESCRIPTION OF THE PREFERRED EMBODIMENT

Figure 1:
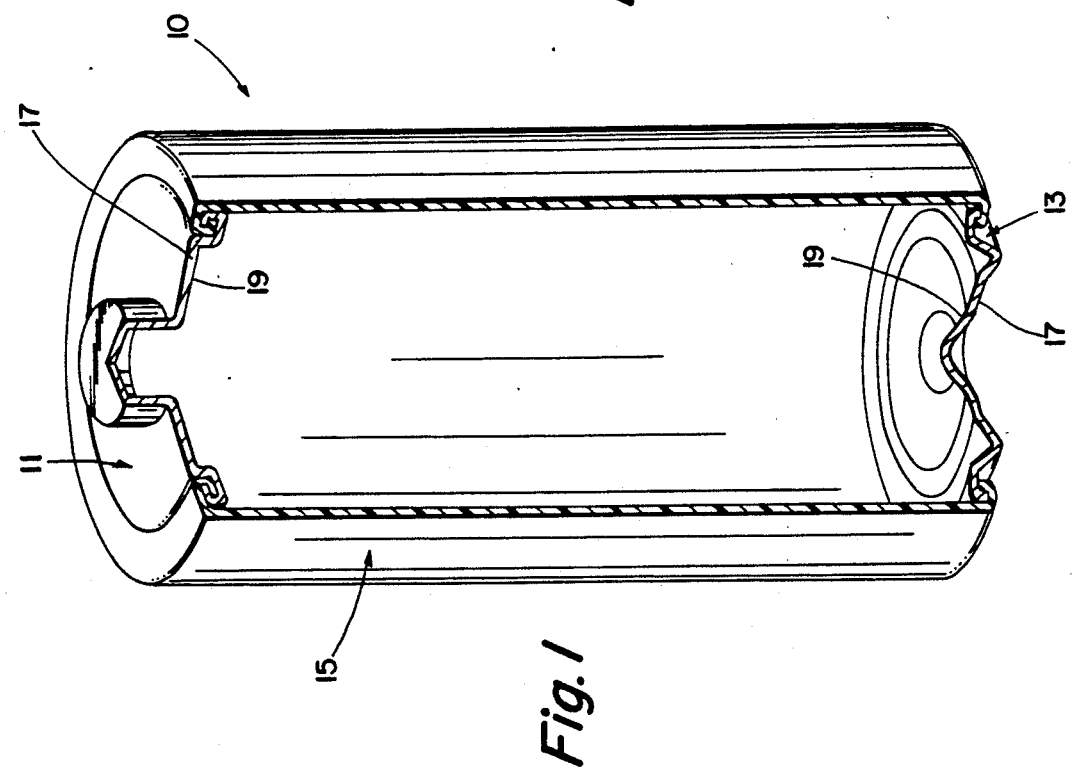
FIG. 1 is a perspective view partially in section of the containment means used with a galvanic cell.

In FIG. 1 there is illustrated the containment means for a conventional dry cell battery. The containment means is indicated generally by the number 10 and consists of end covers 11 and 13 and an electrically nonconductive jacket 15. The nonconductive jacket is in sealing engagement with and situated between the end covers 11 and 13 such that the covers are electrically insulated from one another. In the preferred embodiment illustrated in FIG. 1, both end covers for the battery 10 are made up of a plastic inner layer 17 and a conductive coating of electroless plated metal 19. While the preferred embodiment uses a plastic cover at each end of the battery, it is certainly within the scope of the present invention to use only one metal-coated plastic cover for the battery and have the other or remaining cover a conventional plated steel cover.

The plastic covers can be made by any well-known plastic forming or cutting technique. For example, the covers could be extruded, injection molded or preferably hot stamped from strip or sheet material. In the hot stamping process, the sheet of plastic can be cut to size and any contact or reinforcing shape added to the cover at the same time. For example, one cover of a battery usually has a raised central button for forming a contact while the other cover usually has some type of pattern such as circular corrugations to reinforce the otherwise flat surface.

The size of the cover is dependent on the size of the standard cell for which it is being prepared. The size, for example and not by way of limitation, can run anywhere from the AAA to a D size cell. The thickness of the cover can vary. It should be strong enough to safely contain gas pressure generated in the cell and to protect and contain the components of the cell while in operation and during shipping.

Many different plastic or polymeric materials can be used to form the covers. Borg-Warner, General Electric, Monsanto and Uniroyal all manufacture thermoplastic resins suitable for use in electroless plating. While many different plastic materials can be used functionally to satisfy the use of the present invention, there are preferred materials which, when plated, produce a cover with a superior overall appearance. The following materials have been determined to produce battery covers with outstanding physical appearance. The preferred plastic materials are ABS (acrylonitrile-butadiene-styrene) engineering thermoplastics, polysulfone thermoplastics, polypropylene and modified poly(-phenyleneoxide).

Plastic end cover blanks are preferably cut and shaped and then subjected to a surface treatment using chromic acid, sulfuric acid and water. The etching process converts the normally hydrophobic surface to a hydrophilic surface and roughens this surface to a small extent to increase the adhesion of the subsequently applied electroless plated metal. After the etching process is completed, the surface is neutralized using a mild basic or acidic reducing agent. Neutralization removes a large amount of the hexavalent chromium from the surface. Hexavalent chromium shortens the life of the catalyst, and trace amounts can completely inhibit electroless nickel deposition.

The electroless plating of metal upon non-conductive surfaces, and particularly plastic surfaces, is well-known in the art. The electroless plating of nickel was the subject of U. S. Pat. No. 2,532,283 issued Dec. 5, 1950, to A. Brenner and G. Riddell and assigned to the United States government. The patentees were researchers at the National Bureau of Standards and found that nickel could be electrolessly plated by the autocatalytic chemical reduction of aqueous metal ions. The metal ions are reduced to metal by the action of the chemical reducing agent or electron donor which supplies electrons to the positively charged metal ions to reduce the ion to the elemental state. The components of the electroless bath include an aqueous solution of metal ions, a catalyst, reducing agent(s), complexing agent(s), and bath stabilizers operating at a specific metal ion concentration, temperature and pH.

As discussed above, it is preferred that the plastic surface be given an initial etch to prepare the surface for the electroless deposition. The surface can also be treated with a catalyst such as tin chloride or paladium chloride to provide active sites on the surface. If a well-cleaned and prepared plastic surface is immersed in the electroless plating bath, any deposition of metal on the surface would catalyze the continual plating process until the desired thickness of plate is obtained or the bath is depleted.

A detailed description of the background and techniques for electroless plating is presented in Kirk-Othmer Encyclopedia of Chemical Technology, Third Edition, Volume 8, at pages 738-750. Another source of information on electroless plating is Metal Finishing-Guidebook and Directory Issue, 1989, published by Metal and Plastic Publications Inc., 3 University Plaza, Hackensack, NJ, pages 387-401. The contents of both of these reference works are incorporated herein by reference. The following are compositions of representative electroless nickel plating baths:

A low-temperature bath consists of the following components:

| Nickel sulfate | 30 g/L |
| Sodium hypophosphite | 30 g/L |
| Sodium pyrophosphate | 60 g/L |
| Triethanolamine | 100 ml/L |
| pH | 10.0 |
| Temperature | 30 to 35° C. (86 to 95° F.) |

An example of a high-temperature, alkaline, electroless nickel-phosphorus bath is

| Nickel sulfate | 33 g/L |
| Sodium citrate | 84 g/L |

-continued

| Ammonium chloride | 50 g/L |
| Sodium hypophosphite | 17 g/L |
| pH | 9.5 |
| Temperature | 85° C. (185° F.) |

The following is an example of an acid hypophosphite reduced bath:

| Nickel sulfate | 28 g/L |
| Sodium acetate | 17 g/L |
| Sodium hypophosphite | 24 g/L |
| Lead acetate | 0.0015 g/L |
| pH | 4.6 |
| Temperature | 82 to 88° C. (180 to 190° F.) |

The thickness of the electroless plate is not critical so long as it is thick enough to carry the current produced by the cell. To increase the thickness of the plate, the substrate can be left in the bath for longer periods of time. The electroless bath can deposit metal at approximately 0.5 to 1 mil per hour. The part can be left in the bath until sufficient thickness is obtained, or once the surface has been made conductive, the part can be moved to an electroplating bath where a thicker coat or a flash coat of metal can be applied.

Through the use of a combination of plating techniques, it is possible to apply electroless nickel, tin, and alloys thereof to the plastic substrate and then plate nickel or tin over the deposited substrate to the thickness desired. To improve the appearance of the cover, the conditions of the electroplating process can be adjusted, as is well-known in the art, to provide a bright finish.

Figure 2:
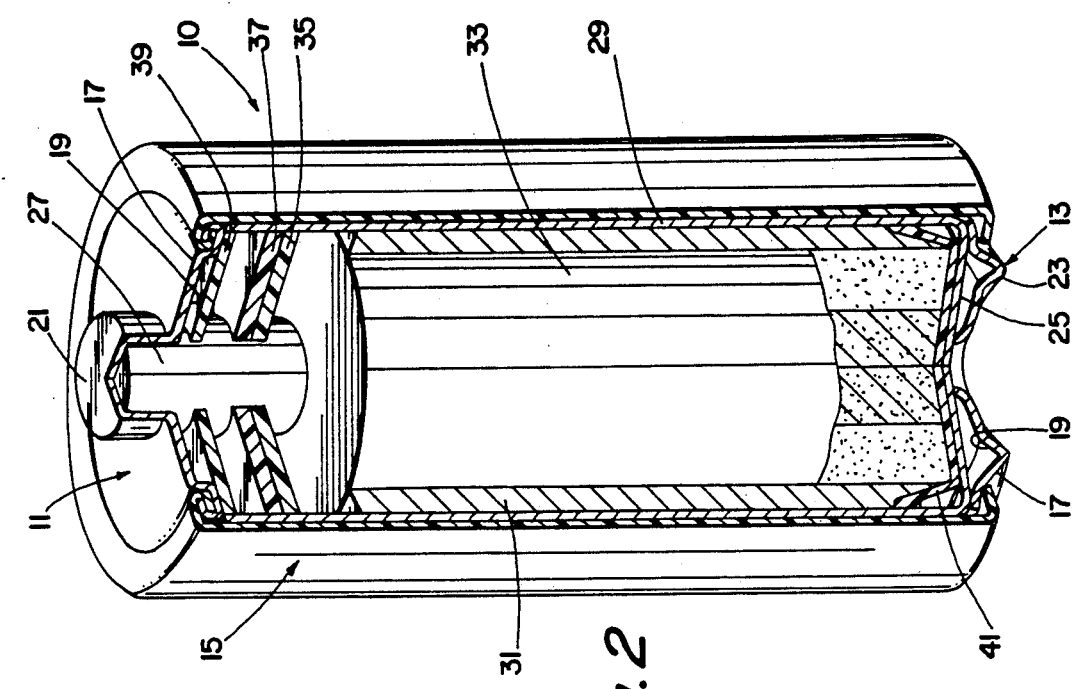
FIG. 2 is a sectional view of a galvanic cell incorporating the electroless plated end covers of the present invention.

Referring to FIG. 2, an improved dry cell can be prepared using electroless-plated plastic end covers at each end of the cell. The end cover 11 has a raised contact portion 21. The end cover 13 has a reinforcing corrugation 23 formed therein. It can be seen in FIG. 2 that end cover 13 is in contact with the zinc cup at point 25. The electroless metal covering 19 on the end cover 13 forms an electrically conductive path from the contact point 25 where the zinc surface is contacted out and around to the exposed surface of the end cover. In a similar manner the inner surface of end cover 11 contacts the cathode's current collector 27 and has an electrically conductive path across the inner surface, around the edge and onto the outer surface of the raised contact surface 21.

The cell illustrated in FIG. 2 is a conventional Leclanche cell having a zinc cup or external anode 29, a porous separator 31, graphite powder or carbon black and manganese dioxide moistened with ammonium chloride and zinc chloride 33, and a carbon rod current collector 27.

Other elements illustrated in FIG. 2 are conventional to Leclanche cell construction and include a support washer 35, a seal 37, a washer 39, and a cup-shaped insulator (41) located at the bottom of the zinc can. The outer jacket 15, to which the end covers 11 and 13 are tightly sealed, completes the cell.

Several cells of the type shown in FIG. 2 were prepared and then subjected to a rapid discharge. The cells were then placed on long-term, room temperature storage to simulate being left in a flashlight in a discharged condition. After several months, it was noted that the zinc electrode was substantially corroded in all of the cells and that the electrolessly plated end caps were still serviceable and in only minor cases showed evidence of deterioration. It was apparent from these tests that the electroless plated end covers were a substantial improvement in the cells.

Though the invention has been described with respect to a specific preferred embodiment thereof, many variations and modifications will become apparent to those skilled in the art. It is therefore the intention that the appended claims will be interpreted as broadly as possible in view of the prior art to include all such variations and modifications.

The embodiments of the invention in which an exclusive property or privilege is claimed are defined as follows:

1. An electrical battery comprising:
   a housing having an elongated shell and first and second open ends for containing the components of a voltaic cell;
   a first metal plated plastic end cover for closing off the first end of said housing and for forming a first electrical contact for said battery; and
   a second metal plated plastic end cover for closing off the second end of said housing and for forming a second electrical contact for said battery.

2. An electrical battery as set forth in claim 1 wherein the plastic used to form the end covers is compatible with the components making up the voltaic cell.

3. An electrical battery as set forth in claim 1 wherein the plastic end cover is formed from an acrylontrile-butadiene-styrene engineering plastic.

4. An electrical battery as set forth in claim 1 wherein the plastic end cover is formed from polypropylene.

5. An electrical battery as set forth in claim 1 wherein the plastic end cover is formed from poly(phenyleneoxide).

6. An electrical battery as set forth in claim 1 wherein the plastic end cover is formed from polysulfone thermoplastics.

7. An electrical battery as set forth in claim 1 wherein the plastic end cover is coated with nickel.

8. An electrical battery as set forth in claim 1 wherein the plastic end cover is coated with tin.

9. An electrical battery as set forth in claim 1 wherein the plastic end cover has a coated metal pattern forming an electrically conductive path from the inside of said battery to the outside.

10. An electrical battery as set forth in claim 1 wherein the plastic end covers have an electroless plated layer of a metal selected from the group consisting of nickel, tin and alloys thereof.

11. An electric battery comprising:
    a shell having first and second open ends for containing the several components making up a voltaic cell;
    an anode disposed in said shell;
    a cathode disposed in said shell;
    an electrolyte for assisting in the electrochemical reaction contained in said shell in operating relation with said anode and said cathode;
    a first end cover for closing the first end of said shell and for forming a first electrical contact for said battery;
    a second end cover for closing the second end of said shell and for forming a second electrical contact for said battery; and
    wherein at least one of said first end cover and second end cover is made of plastic and has a conductive coating thereon completing a conductive path from one side of said cover to the opposite side of said cover.

* * * * *